Patented June 4, 1935

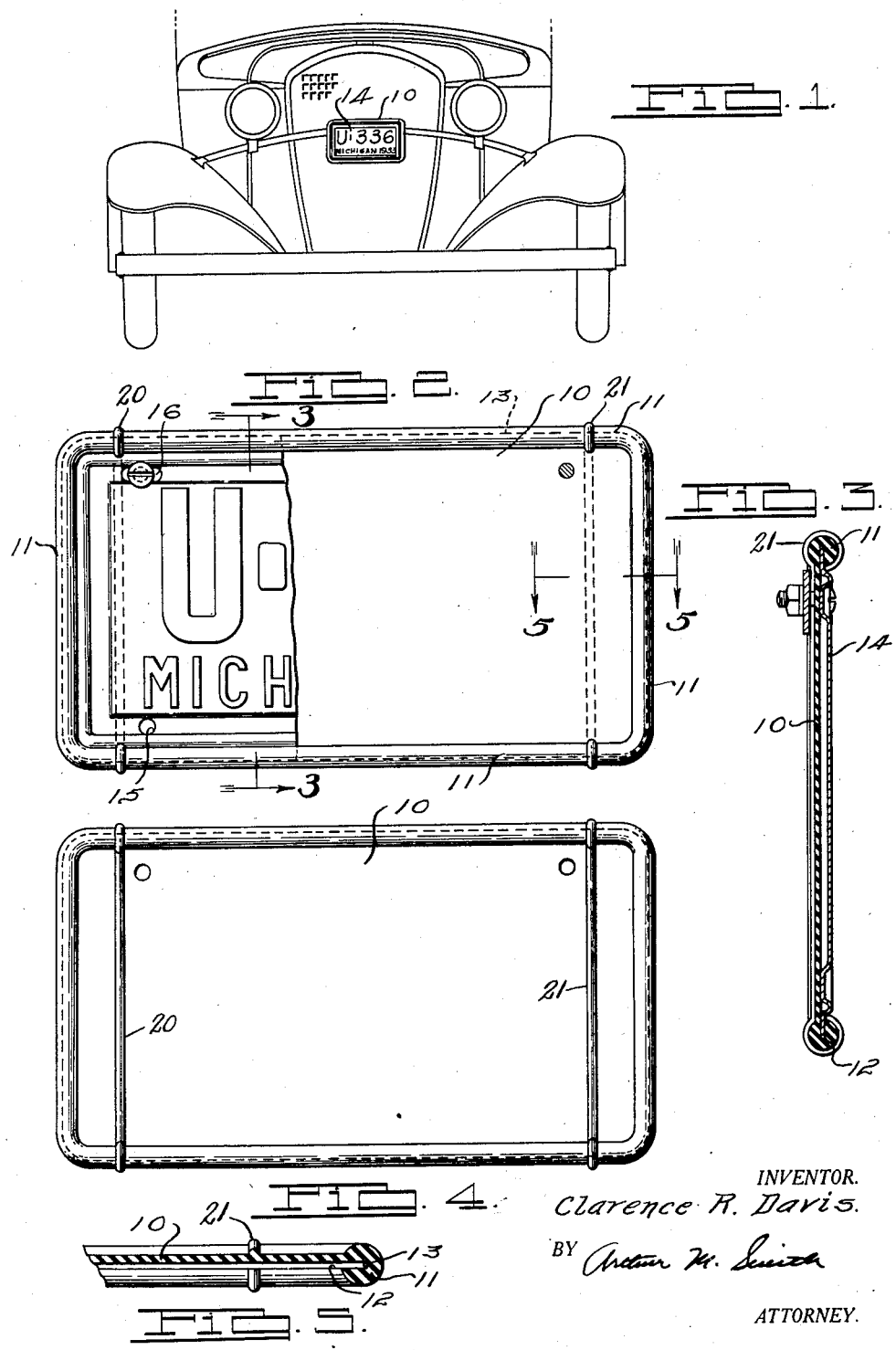

2,003,343

UNITED STATES PATENT OFFICE 2,003,343

AUTOMOBILE LICENSE PLATE HOLDER

Clarence R. Davis, Detroit, Mich., assignor to Davis Tool & Engineering Company, Detroit, Mich., a corporation of Michigan Application February 3, 1933, Serial No. 654,986

1 Claim. (Cl. 40—125)

My invention relates to a license plate holder and particularly to such a holder formed of resilient material such as rubber or the like.

License plate holders known to the art prior to my invention have been formed of metal or other rigid material and held in place on the license plate by various types of fasteners, either passing through some part of the holder or through the license plate and the holder. Such license plate holders are inconvenient to install and expensive to manufacture. Variations in dimensions of the license plates or in the holders frequently result in a rattling of the plate in the holder, which is very undesirable. Metal holders also must be plated or otherwise treated to resist rust and corrosion, and if this plating or other treatment wears off, the metal is exposed to the elements and soon rusts or corrodes or otherwise destroys the ornamental appearance of such device. Many of the metal license plate holders heretofore in use have required special brackets in order to hold them securely in place on a motor vehicle. This has added to the expense and to the inconvenience of installation.

It is, therefore, an object of my present invention to provide a holder for automobile license plates which is easy to install and inexpensive to manufacture.

It is a further object of my present invention to provide a license plate holder for automobile license plates which eliminates the rattle of the license plate in the holder and eliminates the rattle resulting from contact between the license plate and the license plate bracket.

It is a further object of my present invention to provide a holder for automobile license plates which is formed of rubber and is not affected by rust or corrosion and which effectually protects the license plate enclosed therein from rust or corrosion due to faulty enameling around the edges of the plate.

It is a further object of my present invention to provide a license plate holder which forms a cushioned protective edge around the outer edges of a license plate, thus eliminating the sharp edges of the plate and giving to the entire license plate an ornamental appearance not otherwise possessed.

It is a further object of my present invention to provide a license plate holder which may be lacquered or painted to harmonize with any predetermined color scheme.

These and various other objects, features of arrangement, constructiion and operation are plainly shown and described and will be best understood by reference to the accompanying drawing showing a preferred embodiment of my invention, in which:

Fig. 1 is an elevation of the front portion of a motor vehicle showing a license plate enclosed in a license plate holder embodying my invention;

Fig. 2 is a front elevation of a license plate holder having a license plate held therein, a portion of the license plate being broken away;

Fig. 3 is a sectional view taken on the line 3—3 of Fig. 2;

Fig. 4 is a rear elevation of a license plate holder embodying my invention;

Fig. 5 is a fragmentary sectional view taken on the line 5—5 of Fig. 2.

Similar reference numerals refer to similar parts throughout the several views.

Referring more in detail to the drawing, 10 designates a body portion of a license plate holder embodying my invention, the body portion 10 being formed of a moulded rubber which is so vulcanized as to retain a certain amount of resiliency, and which is yet rigid enough to form a support to which the sides of the license plate holder may be attached. 11 designates an edge member secured to the four edges of the body portion 10, the edge member 11 being provided with a continuous cut-away slotted portion 12, through which the edge of the license plate extends to the hollow interior 13 of the edge 11. The license plate 14 is thus held in place by the contact of its four edges by the member 11, and protected in the back by the body portion 10 of the license plate holder.

A pair of spaced apart parallel ribs 20 and 21 (Fig. 4) are provided for the purpose of reenforcing the body 10 of the holder and the frame portion 11 secured thereto. These members preferably are formed integrally with the back and the frame portion and are of molded resilient rubber.

The license plate in the holder is secured to the motor vehicle in any desired conventional manner, one such method being the provision of holes 15 or slots 16 in the face portion of the license plate, and means for securing the license plate through the holes 15 or the slots 16 to the license plate bracket secured to the motor vehicle. When so secured to the motor vehicle, it is to be noted that the rubber forming the license plate holder acts as a cushioning element between the license plate and the license plate bracket and thus eliminates the rattle which otherwise is present as a result of the direct metal-to-metal contact of the license plate and the license plate bracket.

It also is to be observed that the use of the rubber holder embodying my invention likewise forms a continuous protective edge around the license plate and completely covers the back of the license plate.

The operation of a device embodying my invention is as follows:

License plate holders embodying my invention are moulded in a number of standard sizes to accommodate a number of different sized automobile license plates. The holder is preferably constructed of such a dimension that it is necessary to stretch the rubber forming the body portion 10 and the edge member 11 to a slight extent when placing it upon the license plate. The license plate 14 is placed inside the holder and the edge of the license plate 14 extends through the slotted portion 12 to the interior of the frame portion 11 and is engaged by the frame portion 11.

When placed in a holder embodying my invention, the license plate and holder may be secured to the conventional type license plate brackets in any desired manner, such as the passing of fastening bolts, screws, or the like, through the face of the license plate and the holder and securing them to the bracket.

While I have illustrated a preferred embodiment of my invention, many modifications may be made without departing from the spirit of the invention, and I do not wish to be limited to the precise details of construction as herein set forth, but desire to avail myself of all changes within the scope of the appended claim.

Having thus described my invention, what I claim is new and desire to secure by Letters Patent of the United States is:

A moulded rubber license plate holder including a body portion, a frame portion integral therewith extending around the sides thereof and adapted to engage the opposite sides of the edges of a license plate held therein, said frame portion being substantially circular in cross section and provided with a continuous groove extending on the inner face thereof and secured to said body portion in such a manner as to conform to the outline of a license plate of predetermined contour to be held therein and to be maintained in intimate contact with the sides and back thereof, and a plurality of spaced apart resilient reenforcing ribs formed integrally in said body and frame portions and extending across said body portion and said frame portion.

CLARENCE R. DAVIS.